(12) United States Patent  
Mulder

(10) Patent No.: US 7,997,329 B2  
(45) Date of Patent: Aug. 16, 2011

(54) TUBE BUNDLE

(75) Inventor: Dominicus Fredericus Mulder, Amsterdam (NL)

(73) Assignee: Shell Oil Company, Houston, TX (US)

( * ) Notice: Subject to any disclaimer, the term of this patent is extended or adjusted under 35 U.S.C. 154(b) by 2028 days.

(21) Appl. No.: 10/358,942

(22) Filed: Feb. 5, 2003

(65) Prior Publication Data

US 2003/0173066 A1    Sep. 18, 2003

(30) Foreign Application Priority Data

Feb. 5, 2002   (EP) ..................................... 02075465

(51) Int. Cl.  
F28F 9/00   (2006.01)  
F28D 7/00   (2006.01)

(52) U.S. Cl. ........................ 165/162; 165/161

(58) Field of Classification Search .......... 165/159–162, 165/905, 907, 178; 422/201, 205  
See application file for complete search history.

(56) References Cited

U.S. PATENT DOCUMENTS

| 2,018,037 A | | 10/1935 | Sieder | 257/239 |
|---|---|---|---|---|
| 2,430,420 A | * | 11/1947 | Evans | 422/216 |
| 2,703,702 A | * | 3/1955 | Meinel | 165/128 |
| 3,409,075 A | * | 11/1968 | Long | 165/154 |
| 3,825,063 A | * | 7/1974 | Cowans | 165/146 |
| 4,493,368 A | | 1/1985 | Gronnerud et al. | 165/159 |
| 4,762,650 A | * | 8/1988 | Bosman | 261/100 |
| 4,921,681 A | * | 5/1990 | Ozero et al. | 422/197 |
| 5,366,188 A | | 11/1994 | Kramer et al. | 248/68.1 |
| 5,642,778 A | * | 7/1997 | Gentry | 165/162 |
| 6,116,347 A | * | 9/2000 | Alhamad | 169/46 |

FOREIGN PATENT DOCUMENTS

| DE | 1 601 794 | 2/1971 |
|---|---|---|
| DE | 31 36 865 A1 | 3/1983 |
| EP | 0 027 092 A1 | 4/1981 |
| EP | 0 445 391 A1 | 9/1991 |
| FR | 2 393 217 | 12/1978 |
| JP | 57202497 | 12/1982 |

OTHER PUBLICATIONS

International Search Report of Jun. 24, 2003.  
*Perry's Chemical Engineers' Handbook*, 5th Edition, 1973, McGraw-Hill Inc., pp. 11-3-11-21.

* cited by examiner

*Primary Examiner* — Tho V Duong  
(74) *Attorney, Agent, or Firm* — Charles W. Stewart

(57) ABSTRACT

The invention relates to a cylindrical vessel having a cylindrical shell provided internally with a tube bundle having a number of parallel tubes and axially spaced apart transverse supports for supporting the tubes in the cylindrical vessel, wherein each transverse support is a sheet of expanded metal.

13 Claims, 2 Drawing Sheets

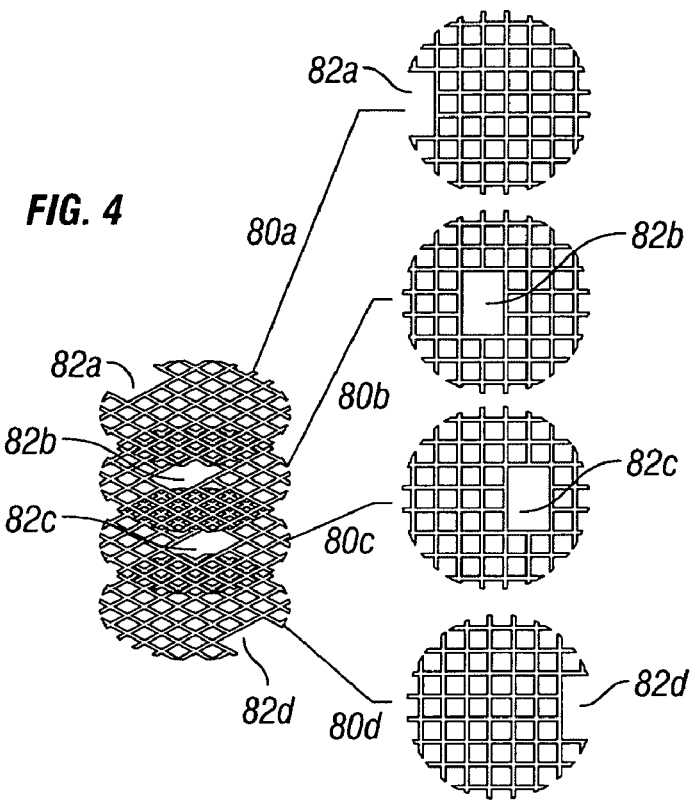
FIG. 4
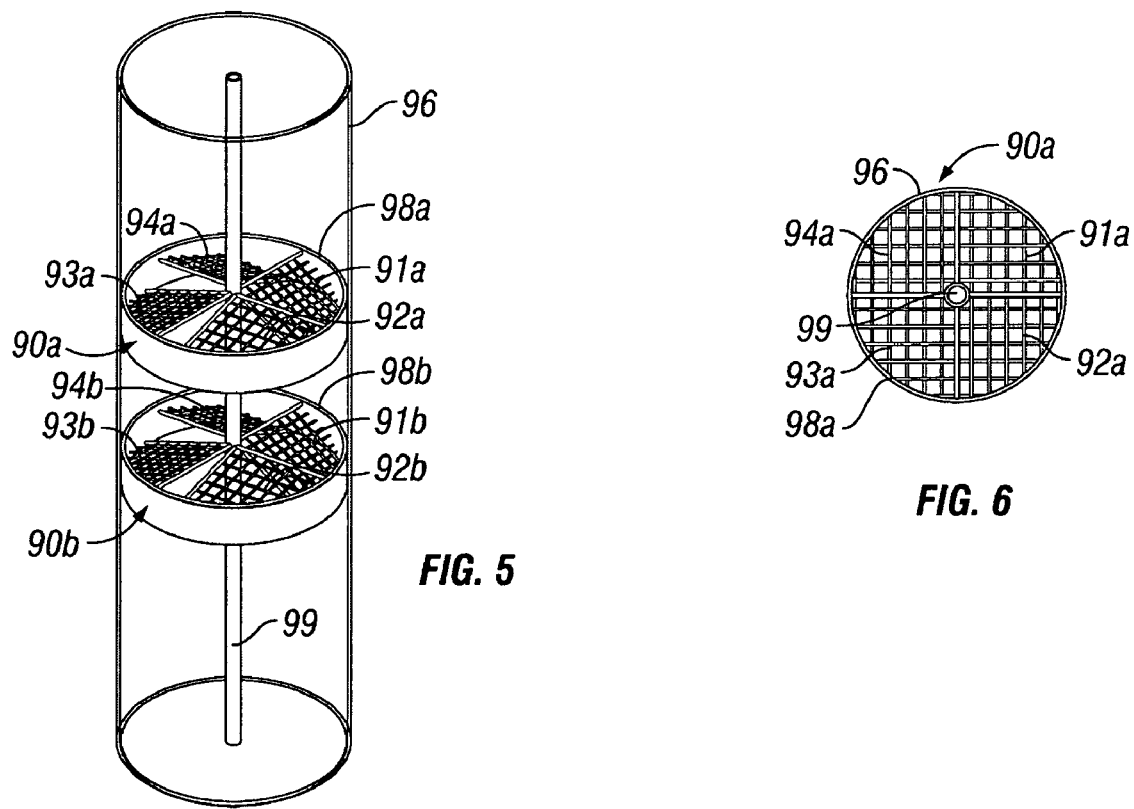
FIG. 5
FIG. 6

US 7,997,329 B2

TUBE BUNDLE

FIELD OF THE INVENTION

The present invention relates to a tube bundle comprising a plurality of parallel tubes and axially spaced apart transverse supports for supporting the tubes in a cylindrical vessel. In another aspect, the invention relates to a cylindrical vessel provided internally with the tube bundle, and, in a further aspect, the invention relates to a heat exchanger comprising a cylindrical shell and the tube bundle arranged in the cylindrical shell.

BACKGROUND OF THE INVENTION

A major area of application of the tube bundle is in shell-and-tube heat exchangers. A shell-and-tube heat exchanger comprises a cylindrical vessel internally provided with a tube bundle comprising a plurality of parallel tubes that extend in longitudinal direction of the vessel, wherein the tube bundle further comprises axially spaced apart transverse supports for supporting the tubes in the cylindrical vessel.

As is well known, the shell-and-tube heat exchanger is an indirect heat exchanger in which heat is transferred between a fluid passing through the tubes of the tube bundle (the tube side) and a fluid passing through the space outside the tubes (the shell side). Details concerning shell-and-tube heat exchangers can be found in resources such as *Perry's Chemical Engineers' Handbook, 5<sup>th</sup> edition*, 1973, McGraw-Hill Inc., page 11-3 to 11-21. The tube bundle is the most important part of the heat exchanger. The ends of the tubes are secured to a tube sheet. The heat exchanger can include two tube sheets, one at each end of the cylindrical vessel, or a single tube sheet at one end of the cylindrical vessel in the event the heat exchanger is a U-tube exchanger.

It will be understood that the intermediate portions of the tubes have to be supported for purposes such as the prevention of damage to the tubes due to vibrations caused by the fluid flow. To support the intermediate portions of the tubes, the tube bundle includes axially spaced apart transverse supports. A conventional support is a baffle, and there are several kinds of baffles discussed in Perry's. Baffles not only support the tubes, but, because they restrict the flow area in the shell side, baffles also control the fluid flow through the shell side. Therefore, the design of a baffle is determined by heat-transfer considerations as well as for use as a support.

U.S. Pat. No. 2,018,037 discloses a tube support that is designed to reduce the restriction of the flow area in the shell side. This publication discloses a tube bundle comprising a plurality of parallel tubes and axially spaced apart transverse supports for supporting the intermediate portions of the tubes in a cylindrical vessel, wherein the transverse supports consist of rods or bars arranged in lanes between the rows of tubes. A transverse support consists of a support ring that has an outer diameter that is somewhat smaller than the inner diameter of the cylindrical vessel and parallel rods or bars that are secured at their ends to the support ring. When the tubes of the tube bundle are arranged on a triangular pitch (wherein the tubes are so arranged that their centers are on the corner points of equilateral triangles), a set of three axially spaced apart transverse supports arranged at angles of 60° between them will suffice to support the tubes in all directions. And when the tubes are arranged on a square pitch (wherein the tubes are so arranged that their centers are on the corner points of squares), a set of two axially spaced apart transverse supports arranged at angles of 90° between them will suffice to support the tubes in all directions.

Because the known transverse supports consist of a support ring and parallel rods or bars secured thereto, it is not easy to manufacture the tube bundle provided with the known transverse supports.

A particular application of tube bundles is in chemical reactors comprising a tube bundle in a shell, such as those used in the production of ethylene oxide. A very open tube support structure is often required in such a setting. A transverse support for this application is for example known from U.S. Pat. No. 5,366,188. The known support is made from a solid disk that is perforated in a specific way. Manufacturing of such perforated discs is rather expensive.

It would be beneficial to have a tube bundle that is inexpensive and easy to manufacture.

SUMMARY OF THE INVENTION

The tube bundle of the present invention comprises a plurality of parallel tubes and axially spaced apart transverse supports for supporting the tubes in a cylindrical vessel, wherein each transverse support is made of a sheet of expanded metal.

A sheet of expanded metal is made from sheet metal that is slit and stretched into a structure of cross laths with interstices. Its manufacture is simple and each sheet can easily be cut into a circular shape by methods such as laser cutting.

BRIEF DESCRIPTION OF THE DRAWINGS

FIG. 4 shows an example of segmental transverse supports.

FIG. 5 shows an example of transverse supports formed of circular segments.

FIG. 6 shows a top view of one of the transverse supports of FIG. 5.

DETAILED DESCRIPTION OF THE INVENTION

Figure 1:
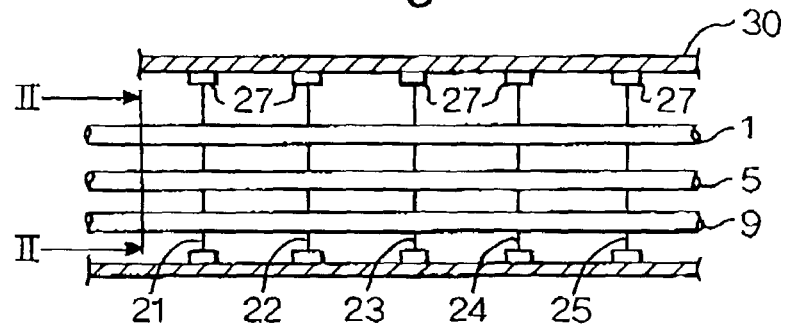
FIG. 1 shows part of a longitudinal section of the tube bundle of the present invention.

The size of the interstices in the sheet of expanded metal can be selected such that it is about equal to the diameter of the tube, so that the tube is supported in the transverse directions by a single transverse support. Alternatively, the size of the interstices can be larger than the diameter of the tube, so that a transverse support supports the tube in one or two transverse directions. In this case, two or more transverse supports displaced relative to each other will be needed to support a tube in all transverse directions.

In the specification and in the claims, the expression 'the size of the interstices is about equal to the diameter of the tube' is used to refer to a size of the interstices of the transverse support that is bound by a lower and an upper limit. The lower limit is that the tube can pass through the interstices with no play, and the upper limit is that a gauge tube having an outer diameter that is 10% larger than the tube can pass through the interstices with no play. The expression 'the size of the interstices is larger than the diameter of the tube' is used to refer to a size of the interstices of the transverse support that is bounded by a lower limit, wherein the lower limit is that a gauge tube having an outer-diameter that is 50% larger than the outer diameter of the tube of the tube bundle can pass through the interstices with no play. A practical upper limit is that two to four parallel tubes of the tube bundle arranged at their normal distance between their centerlines can pass through the interstices with no play.

The tube bundle according to the present invention comprises a plurality of parallel tubes 1, 2, 3, 4, 5, 6, 7, 8 and 9 and axially spaced apart transverse supports 21, 22, 23, 24 and 25 to support the intermediate parts of the tubes in a cylindrical vessel having cylindrical shell 30. Please note that FIG. 1 does not show the end parts of the tubes with the tube sheet.

Each transverse support is made of a sheet of expanded metal 40. The sheet of expanded metal 40 is a structure of cross laths 41 with interstices 42. For the sake of clarity in FIG. 2, not all laths and interstices have been referred to by a reference numeral. The size of the interstices 42 should be about equal to or larger than the outer diameter of a tube 1-9.

Figure 2:
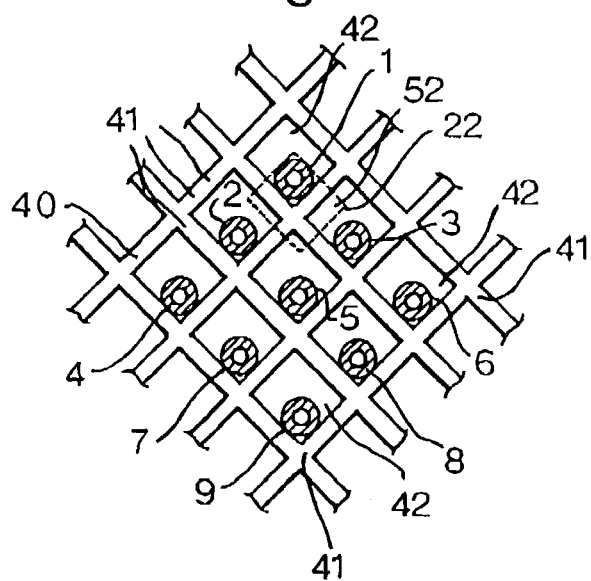
FIG. 2 shows a view along line II-II of FIG. 1 drawn at a larger scale.

As can be seen from FIG. 2, the size of the interstices 42 of the expanded metal sheet 40 forming the transverse support 21 is larger than the outer diameter of the tubes 1-9. Thus, the transverse support 21 supports the tubes 1-9 in downward direction only. In order to support the tubes in upward direction, the next transverse support 22 is staggered with respect to the transverse support 21. In dashed lines, the edge of an interstice 52 of the expanded metal sheet of the next transverse support 22 is shown in FIG. 2.

Optionally, the expanded metal sheets of the transverse supports can be secured to a support ring 27 (FIG. 1) having an outer diameter that is slightly less than the inner diameter of the cylindrical shell 30. The support rings 27 can be connected by means of connecting rods (not shown) provided with spacer elements (not shown) to ensure that the axial spacing of the transverse supports is maintained during installation and normal operation.

In the embodiment of the invention shown in FIG. 2, the tubes are arranged in a square pitch, at 450 from the horizontal. In an alternative embodiment the square pitch is horizontal, and this would mean that FIG. 2 is turned over 45°. In this embodiment, four transverse supports will be required to support the parallel tubes in the transverse directions (left, right, up and down).

In the embodiment of the invention shown in FIGS. 1 and 2, two adjacent transverse supports support all tubes. Alternatively, each transverse support supports the tubes in all transverse directions, in which case the size of the interstices of the expanded metal sheet is about equal to the outer diameter of the tube.

Figure 3:
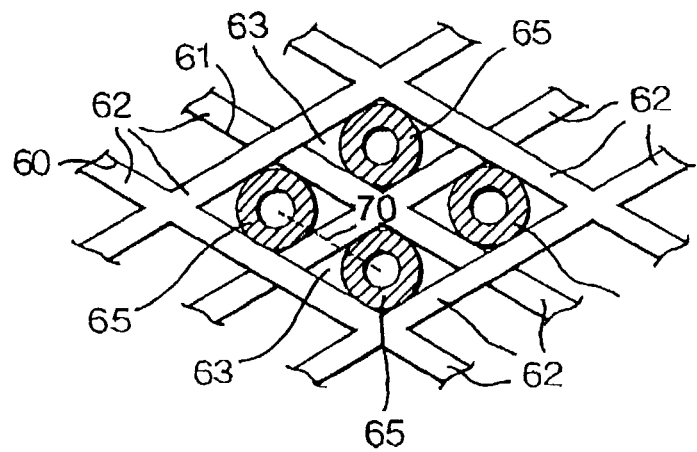
FIG. 3 shows an alternative sizing of the interstices of the transverse supports.

Reference is now made to FIG. 3, showing only a small part of two adjacent transverse supports arranged one after the other made of sheets of expanded metal 60 and 61 and displaced relative to each other. The sheets of expanded metal 60 and 61 comprise cross laths 62 with interstices 63. For the sake of clarity in FIG. 3, not all laths and interstices have been referred to by a reference numeral. The size of the interstices 63 is larger than the outer diameter of a tube 65. In the design shown in FIG. 3, four parallel tubes 65 of the tube bundle arranged at their normal distance 70 between their centerlines can pass through the interstices 63 with no play. The transverse supports have been displaced relative to each other to provide support in all directions.

In the embodiment of the invention as shown in FIGS. 1 and 2, the transverse supports extend over the full inner diameter of the cylindrical vessel. Alternatively, the transverse supports are segmental transverse supports. Segmental supports allow cross-flow of the fluid flow through the shell side of a heat exchanger.

FIG. 4 shows schematically a number of segmental supports 80a,b,c,d of expanded metal, each having an open segment 82a,b,c,d at different positions. The tubes of the tube bundle are not shown for the sake of clarity. By using such segmental supports, the flow during operation is guided through the shell in an alternating pattern, so that there will be some cross flow. The heat transfer at cross flow is better than at longitudinal flow.

FIGS. 5 and 6 show a further embodiment of a transverse support according to the present invention. Each of the transverse supports 90a, and 90b is formed by four circle sectors made of expanded metal, 91a,91b, 92a,92b, 93a,93b, 94a, 94b, in a support ring 98a,98b. Each of the circle sectors is tilted out of the plane perpendicular to the axial direction of tube bundle, i.e. out of the plane that is defined by the support rings 94a,94b. In this example, the circle sectors are arranged such that they are tilted about a diameter of the shell 96. The tilting angle with respect to the horizontal plane is suitably between 20 and 70 degrees. Good results have been obtained with an angle of approximately 30 degrees. A central axial support beam 99 can be arranged for mechanical stability. The tubes of the tube bundle which extend through the interstices of the expanded metal circle are not shown for the sake of clarity.

FIG. 6 shows a top view of transverse support 90a. The circle sectors, as is visible in this projection view, extend over the full inner diameter of the circular shell. It shall be clear that where reference is made to the "size of the interstices" in the specification and in the claims, the size of the projection of the interstices onto a perpendicular plane is meant, which is the size as visible in a top view like in FIG. 6.

It has been found that when the circle segments are tilted in this way, part of the flow will pass the transverse supports through the gaps between the circle sectors. Also, this arrangement will impart a swirl on the flow, which causes cross-flow which improves heat transfer. This arrangement allows higher flow velocities, and there will be no stagnant zones so that fouling tendency is very low.

Further, it is easily possible to install one or more longitudinal baffles along the gaps between the circle sectors. Longitudinal baffles can be used to configure a shell-and-tube heat exchanger such that fluid flows through the shell side in several passes. This allows the construction of shorter heat exchanger vessels. A particular advantageous option is to install two longitudinal baffles cross-wise in an embodiment as shown in FIGS. 5 and 6, along the boundaries between circle sectors and suitably over the full diameter of the shell 95. A central support beam may not be needed. The longitudinal baffles separate the shell in four segments, which are suitably arranged in fluid communication so that fluid passes consecutively through each of the four shell segments. In this way, as an alternative for a heat exchanger vessel of e.g. 24 m length and 1.5 m diameter, a vessel of 6 m length and 3 m diameter can be configured. This can be, for example, a so-called 'Texas tower' heat exchanger.

The invention also relates to a cylindrical vessel comprising a cylindrical shell provided with a tube bundle according to the invention. The cylindrical vessel provided with the tube bundle of the present invention can be a shell-and-tube heat exchanger or a reactor. It can be used in a horizontal position or in a vertical position.

The tube bundle according to the present invention comprises transverse supports that are made of a simple material, expanded metal sheet. Therefore, the tube bundle is easier to manufacture than tube bundles with the known transverse supports. Moreover, the transverse supports of the present invention provide a low resistance to fluid flow.

A particular application of the present invention is in chemical reactors comprising a tube bundle in a shell, such as those used in the production of ethylene oxide. A very open tube support structure is often required in such a setting. A transverse support for this application is for example known from U.S. Pat. No. 5,366,188. The known support is made from a solid disk that is perforated in a specific way. Manufacturing of such perforated discs is rather expensive. A transverse support according to the present invention is a simple alternative. To create a support structure that is very open, the transverse support can suitably comprise a plurality of pieces of expanded metal, wherein each piece is smaller than the cross-section of the reactor vessel and is tilted with respect to the plane of the cross-section, and wherein all pieces are connected together so as to span the cross-section of the reactor vessel. Fluid can flow through each piece of expanded metal, and through the openings between adjacent tilted pieces.

I claim:

1. A tube bundle comprising:
   a plurality of parallel tubes; and,
   axially spaced apart transverse supports for supporting the parallel tubes in a cylindrical vessel,
   wherein the transverse supports comprise a sheet of expanded metal wherein the sheet metal comprises a structure of cross laths with interstices; and,
   wherein the transverse supports are discrete from one another and do not form part of the walls of the parallel tubes.

2. The tube bundle of claim 1, in which each transverse support is a single sheet of expanded metal.

3. The tube bundle of claim 1, in which the transverse supports extend over a full inner diameter of the cylindrical vessel.

4. The tube bundle of claim 1, in which the transverse supports comprise segmental transverse supports.

5. The tube bundle of claim 1, in which each transverse support is substantially formed by circle sectors made of expanded metal.

6. The tube bundle of claim 5, in which the circle sectors are tilted with respect to a plane that extends perpendicular to the tube bundle.

7. The tube bundle of claim 1, in which the size of the interstices of the sheet of expanded metal is about equal to the diameter of the tubes.

8. The tube bundle of claim 1, in which the size of the interstices of the sheet of expanded metal is larger than the diameter of the tubes.

9. The tube bundle of claim 1, in which the size of the interstices of the sheet of expanded metal is larger than the diameter of the tubes, and wherein adjacent transverse supports are displaced relative to each other to provide support in all directions.

10. The tube bundle of claim 1, in which the bundle is arranged internally in a cylindrical vessel comprising a cylindrical shell.

11. The tube bundle of claim 1, in which the tube bundle forms part of a chemical reactor.

12. The tube bundle of claim 11, in which the chemical reactor is an ethylene oxide reactor.

13. The tube bundle of claim 1, in which the tube bundle forms part of a shell-and-tube heat exchanger.

* * * * *